(12) United States Patent
Kato (10) Patent No.: US 7,092,817 B2
(45) Date of Patent: Aug. 15, 2006

(54) MAP INFORMATION RETRIEVING

(75) Inventor: Noriko Kato, Toyoake (JP)

(73) Assignee: Denso Corporation, Kariya (JP)

( * ) Notice: Subject to any disclaimer, the term of this patent is extended or adjusted under 35 U.S.C. 154(b) by 269 days.

(21) Appl. No.: 10/842,525

(22) Filed: May 11, 2004

(65) Prior Publication Data
US 2004/0243304 A1 Dec. 2, 2004

(30) Foreign Application Priority Data
Jun. 2, 2003 (JP) .............................. 2003-157003

(51) Int. Cl.
G06F 17/30 (2006.01)
G01C 21/32 (2006.01)
G08G 1/0969 (2006.01)

(52) U.S. Cl. ...................... 701/208; 701/200; 701/211; 701/212; 707/1; 707/102; 340/995.14

(58) Field of Classification Search ................ 701/200, 701/201, 208, 211, 212; 707/1, 4, 10, 100, 707/102; 711/170, 171; 340/995.14
See application file for complete search history.

(56) References Cited

U.S. PATENT DOCUMENTS

| | | | | |
|---|---|---|---|---|
| 4,888,698 A | | 12/1989 | Driessen et al. ............. | 701/200 |
| 5,754,846 A | * | 5/1998 | Janse et al. .................. | 707/100 |
| 5,797,112 A | * | 8/1998 | Komatsu et al. ............. | 701/201 |
| 6,308,177 B1 | * | 10/2001 | Israni et al. ................. | 707/100 |
| 6,336,111 B1 | * | 1/2002 | Ashby et al. ................. | 707/4 |
| 6,484,090 B1 | * | 11/2002 | Lahaije et al. ............... | 701/208 |
| 6,556,919 B1 | | 4/2003 | Suzuki et al. ................ | 701/208 |
| 6,700,574 B1 | | 3/2004 | Song ........................... | 345/423 |
| 6,782,319 B1 | * | 8/2004 | McDonough ................ | 701/208 |
| 2003/0014392 A1 | | 1/2003 | Meek ........................... | 707/1 |
| 2003/0040893 A1 | | 2/2003 | Popovici ........................ | 703/2 |

FOREIGN PATENT DOCUMENTS

| | | |
|---|---|---|
| EP | 1 139 066 | 10/2001 |
| GB | 2 213 296 | 12/1988 |
| JP | A-H06-43807 | 2/1994 |
| WO | WO 01/03395 | 1/2001 |
| WO | WO 2001/03395 A2 | 5/2001 |

OTHER PUBLICATIONS

Examination Report from Great Britain Patent Office issued on Dec. 7, 2005 for the corresponding Great Britain patent application No. GB0411561.4 (a copy thereof).

* cited by examiner

Primary Examiner—Tan Q. Nguyen
(74) Attorney, Agent, or Firm—Posz Law Group, PLC (57) ABSTRACT

Index data is provided for a retrieval method whose retrieval key does not contain positional information. From such index data, meshes are used to define an area (A1) based on the extent of a user's living area around a retrieval center (P) such as a current position, for example. A retrieval process extracts only index data corresponding to all institutions belonging to the meshes included in this area. The obtained index data is applicable to vicinities of the current position. Accordingly, it is possible to retrieve specific institutions near the current position without calculating distances using coordinate data for institutions included in detail information. As a result, the time for the retrieval process can be shortened.

32 Claims, 10 Drawing Sheets

| | | | | 9** |
|---|---|---|---|---|
| | 1** | | 3** | 8** |
| 5* | 7* | d* | f* | |
| 4* | 6* | c* | e* | 2** |
| 1* | 3* | 9* | b* | |
| 2* | 8* | a* | | |

| 5 | 7 | d | f |
|---|---|---|---|
| 4 | 6 | c | e |
| 1 | 3 | 9 | b |
| 0 | 2 | 8 | a |
| ↑ | | | |
| k | | | |

REFERENCE MESH × 1 : INTEGRATION DEGREE 0
REFERENCE MESH × 4 : INTEGRATION DEGREE 1
REFERENCE MESH × 16 : INTEGRATION DEGREE 2
REFERENCE MESH × 64 : INTEGRATION DEGREE 3
REFERENCE MESH × 256 : INTEGRATION DEGREE 4
REFERENCE MESH × 1024 : INTEGRATION DEGREE 5
...
REFERENCE MESH × $4^n$ : INTEGRATION DEGREE n
(n : INTEGRATION DEGREE)

| WORD | MURAYAMA | | 2 ITEMS |
|---|---|---|---|
| AREA | TOYOAKE SHI | GENRE | BAR/RESTAURANT |

MURAYAMA KARIYA-TEN/ AICHI KEN KARIYA SHI
MURAYAMA TOYOAKE-TEN/ AICHI KEN KARIYA SHI

FIG. 11

| WORD | MURAYAMA | | 243 ITEMS |
|---|---|---|---|
| AREA | ALL | GENRE | MURAYAMA |

MURAYAMA/ HYOUGO KEN TSUNACHOU
MURAYAMA/ TOTTORI KEN KURAYOSHI SHI
MURAYAMA/ SHIMANE KEN MATSUE SHI
MURAYAMA/ OKAYAMA KEN KURASHIKI SHI
MURAYAMA/ OKAYAMA KEN SOUJYA SHI

FIG. 10

MAP INFORMATION RETRIEVING

CROSS REFERENCE TO RELATED APPLICATIONS

This application is based on and incorporates herein by reference Japanese Patent Application No. 2003-157003 filed on Jun. 2, 2003.

FIELD OF THE INVENTION

The present invention relates to a device, method, and program for map information retrieving, which are capable of shortening a retrieval time.

BACKGROUND OF THE INVENTION

Figure 3:
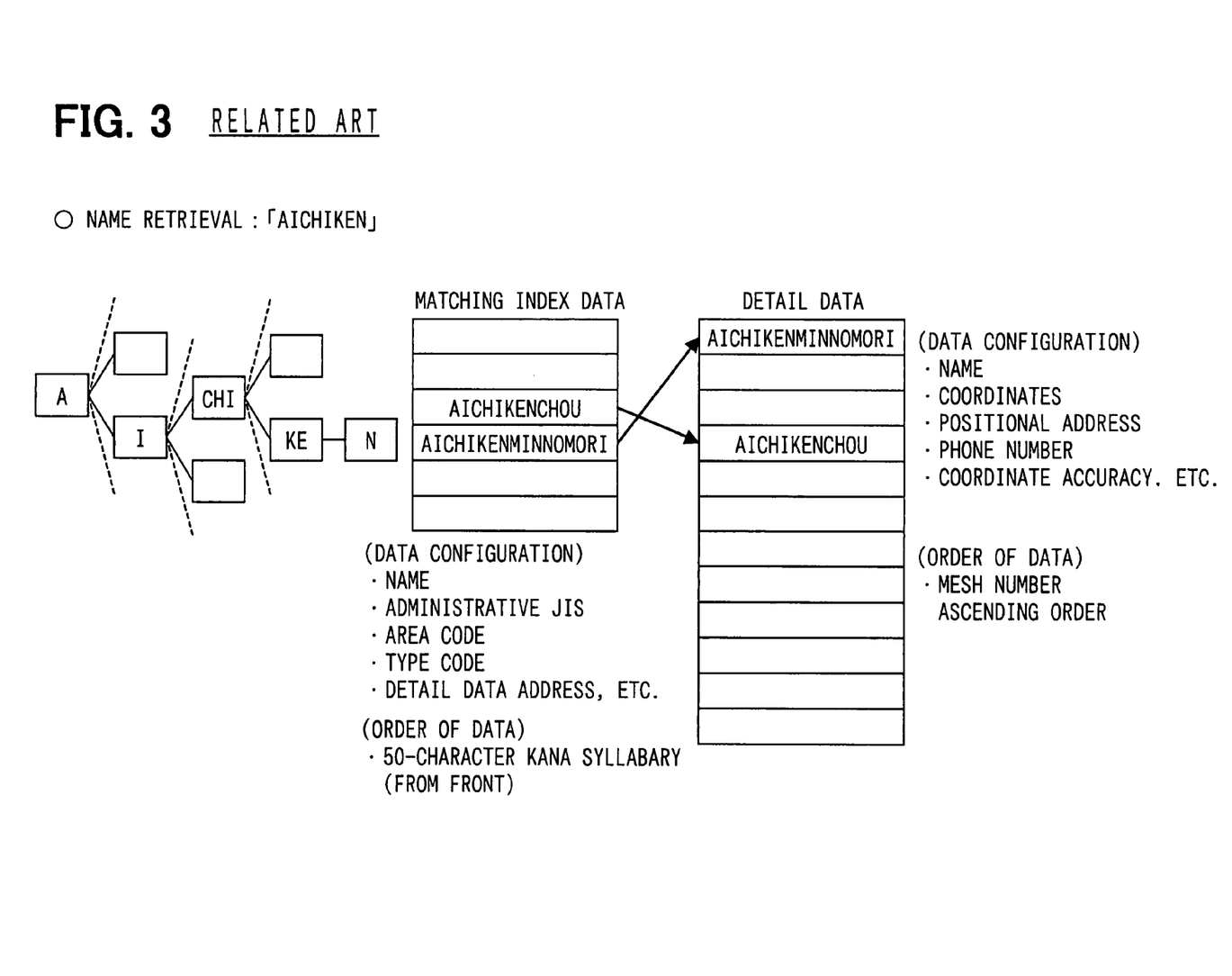
FIG. 3 shows a name retrieval method of a related art.

Conventionally, there is proposed a name retrieving method of entering an institution name and retrieving an institution that matches the entered name. For example, as shown in FIG. 3, an institution matching the name "AICHIKEN" is retrieved from index data for the name retrieval. The index data stores only information needed for the name retrieval. The other detailed information about institutions is stored in detail data. The index data stores an address (or memory address) of the detail data. The detail data can be referenced to from the index data. The index data also stores administrative JIS codes, area codes, and type codes. These pieces of data are used to narrow a range of many matching institutions according to areas and the like. On the other hand, the detail data is stored in accordance with mesh numbers assigned to meshes as disclosed in JP-A-2000-293099 (U.S. Pat. No. 6,556,919), for example.

When an entered name matches many pieces of associated institution data, any retrieval range may be specified to retrieve institutions corresponding to the specified retrieval range. The index data for name retrieval does not contain positional information about institutions. Therefore, the detail data needs to be accessed to extract institutions having the corresponding coordinates. However, too many accesses to the detail data disable an efficient access. As a result, an overall retrieval process takes a long time.

If the index data for name retrieval stores the positional information about institutions, the size of the index data itself increases. This also increases the number of acquisitions of the index data for name retrieval, thus degrading the performance.

SUMMARY OF THE INVENTION

The present invention has been made in consideration of the foregoing. It is therefore an object of the present invention to provide a map information retrieving device, a map information retrieving method, and a map information retrieving program capable of shortening the retrieval time.

To achieve the above object, a map information retrieving device comprises: a detail data storage unit for dividing an institution's retrieval range into a plurality of meshes, determining a given mesh as a reference mesh, sequentially providing numbers to four meshes in an order of the given mesh as a starting point, top, right, and top right of the given mesh so as to write a letter N in one stroke, moving the reference mesh to a certain mesh, repeating this process to provide respective meshes with numbers, and sorting and storing institution's detail data in each of the meshes according to the provided numbers; an index data storage unit for storing index data which is used for institution retrieval and is provided for each of a plurality of retrieval methods; an area setup unit for setting an area containing a specified point as a reference on the retrieval range; a mesh number retrieval unit for retrieving a number of a mesh contained in the area; an address acquisition unit for acquiring an address of institution's detail data stored by the detail data storage unit at a beginning of a mesh with a minimum number retrieved by the mesh number retrieval unit and an address of institution's detail data stored by the detail data storage unit at an end of a mesh with a maximum number retrieved by the mesh number retrieval unit, from index data provided for a retrieval method whose retrieval key contains positional information; an index data acquisition unit for acquiring index data provided for a retrieval method whose retrieval key does not contain positional information; an extraction unit for extracting index data belonging to a range from the address of the institution's detail data stored at the beginning to the address of the institution's detail data stored at the end from the index data acquired by the index data acquisition unit; and a retrieval unit for retrieving a specific institution using the index data extracted by the extraction unit.

In this manner, the map information retrieving device according to the present invention retrieves a specific institution by extracting index data corresponding to institutions in an area with reference to a specified point. The index data is provided for a retrieval method whose retrieval key does not include positional information. This makes it possible to acquire index data in the area with reference to a specified point without access to institution's detail data. As a result, it is possible to shorten the time spent for the retrieval process.

In another aspect of the present invention, the map information retrieving device further comprises a group determination unit for determining a group of meshes assigned with sequential mesh numbers retrieved by the mesh number retrieval unit, wherein the address acquisition unit acquires an address of institution's detail data stored by the detail data storage unit at a beginning of a minimum-numbered mesh constituting a group determined by the group determination unit and an address of institution's detail data stored by the detail data storage unit at an end of a maximum-numbered mesh constituting the group determined by the group determination unit from index data provided for a retrieval method whose retrieval key contains positional information.

In this manner, index data can be accessed efficiently by acquiring only the first and last addresses for institution's detail data stored in each group.

In another aspect of the present invention, in the map information retrieving device, the retrieval unit uses index data extracted by the extraction unit when a specific institution. is retrieved according to at least any of an institution name, a type of business, and a category as a retrieval key. A user can retrieve a specific institution near his or her own house even by using an institution name, a type of business, and a category as a retrieval key, for example.

In another aspect of the present invention, the map information retrieving device is characterized as follows. When the four meshes have been numbered, the detail data storage unit collects the four meshes into a mesh of a first integration degree. The detail data storage unit collects four meshes of the first integration degree into a mesh of a second integration degree by moving in an order of the mesh of the first integration degree as a starting point, top, right, and top right of the mesh so as to write a letter N in one stroke. The detail data storage unit collects four meshes of the second integration degree into a mesh of a third integration degree by moving in an order of the mesh of the second integration degree as a starting point, top, right, and top right of the mesh so as to write a letter N in one stroke. The detail data storage unit repeats this process to manage the institution's detail data by using a plurality of integration degrees. The detail data storage unit provides each of the meshes with a number corresponding to the integration degree.

If there are too many meshes, institution's detail data can be managed in an integrated manner. Further, a plurality of meshes can be managed with a single number by providing a number corresponding to the integration degree.

In another aspect of the present invention, the map information retrieving device is characterized in that the area setup unit sets an area based on a mesh of the integration degree. Generally, a user's living area can be limited to some extent. In most cases, many users are assumed to retrieve institutions in their living areas. Accordingly, an area is defined based on a mesh of integration degree equivalent to the extent of the user's living area, for example. In this manner, the extraction unit can extract index data in the living area. The retrieval unit can be used to retrieve institutions in the living area.

In another aspect of the present invention, in the map information retrieving device, the area setup unit has a change unit for changing an integration degree for an area to be set in accordance with the number of pieces of index data extracted by the extraction unit.

When the extraction unit extracts too many pieces of index data, the retrieval unit retrieves too many institutions. As a result, the retrieval process takes a long time. On the contrary, the extraction unit may extract a very small number of index data. In such case, expanding the range of objects to be retrieved can provide a wide range of retrieval without great influence on the time needed for the retrieval process. Consequently, a preferable retrieval becomes available by increasing or decreasing the integration degree for an area to be set in accordance with the number of index data.

In another aspect of the present invention, the map information retrieving device is characterized as follows. When a set area overlaps a plurality of meshes of an integration degree for the area, the area setup unit sets a new area including all of the overlapped meshes.

When index data is extracted, for example, an area boundary may not overlap a plurality of meshes of the integration degree equivalent to the area size. In such case, it is possible to extract index data for institutions in the mesh of the integration degree corresponding to the area. This is because institution's detail data is stored in the order of mesh numbers, and the index data stores addresses of the detail data. When the area overlaps a plurality of meshes, however, the index data for institutions needs to be compared many times to determine when candidate data matches the area. As a result, extracting the index data consumes a long time.

To solve this problem, the number of groups can be minimized by setting a new area including all of the overlapped meshes. As a result, it is possible to shorten the time to extract the index data for institutions belonging to the meshes included in the area.

In another aspect of the present invention, the map information retrieving device further comprises: a storage unit for storing positional information of the new area in association with an address of institution's detail data stored at the beginning and an address of institution's detail data stored at the end, the addresses being acquired by the address acquisition unit with respect to the new area; and a determination unit for determining whether or not a new area stored by the storage unit includes an area set by the area setup unit based on meshes of the integration degree. When the determination unit determines that the new area includes the area, the extraction unit extracts index data corresponding to addresses associated with the new area stored by the storage unit.

In this manner, the map information retrieving device stores positional data about the new area including all of the overlapped meshes in association with the first and last addresses of the institution's detail data. The positional data includes coordinates of the minimum and maximum latitudes and longitudes, for example. When the prestored new area includes an area to be set for the next retrieval, the map information retrieving device extracts index data corresponding to the prestored address.

In this manner, a specific institution can be retrieved without retrieving a mesh number included in the area or acquiring addresses of the institution's detail data included in the mesh. This greatly shortens the retrieval time.

In another aspect of the present invention, the map information retrieving device further comprises a point specification unit for specifying a point on the retrieval range. The area setup unit sets an area with reference to a point specified by the point specification unit. Consequently, a user can specify any point such as his or her own house or the company he or she is working for.

In another aspect of the present invention, the map information retrieving device is characterized as follows. The index data storage unit stores index data used for a retrieval method whose retrieval key includes at least any of a positional address, an area name, a postal code, a sightseeing spot name, coordinates, and a mesh calculated from coordinates. The index data is provided for a retrieval method whose retrieval key includes the positional information. The index data storage unit stores index data used for a retrieval method whose retrieval key includes at least any of a name, a category, and an object. The index data is provided for a retrieval method whose retrieval key does not include the positional information.

In this manner, a wide range of retrieval becomes available by providing index data corresponding to various retrieval keys. The position-related retrieval keys are not limited to the above-mentioned address, area name, postal code, sightseeing spot name, coordinates, and mesh calculated from coordinates. Any retrieval keys associated with positional information are available such as a telephone number, a district name, a street name, and the like. For example, however, a user's purpose such as trying Italian cuisines cannot be included in the position-related retrieval keys.

Furthermore, to achieve the foregoing object, the present invention is also directed to a method and program (or computer program product) for map information retrieving. The method and program for map information retrieving can be provided with the similar structure to those of the map information retrieving device, so that the description for the method and program is omitted here.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

The following describes the map information retrieving device, the map information retrieving method, and the map information retrieving program according to an embodiment of the present invention with reference to the accompanying drawings. The description to follow covers an example of applying the present invention to a navigation device mounted on vehicles and the like.

Figure 1:
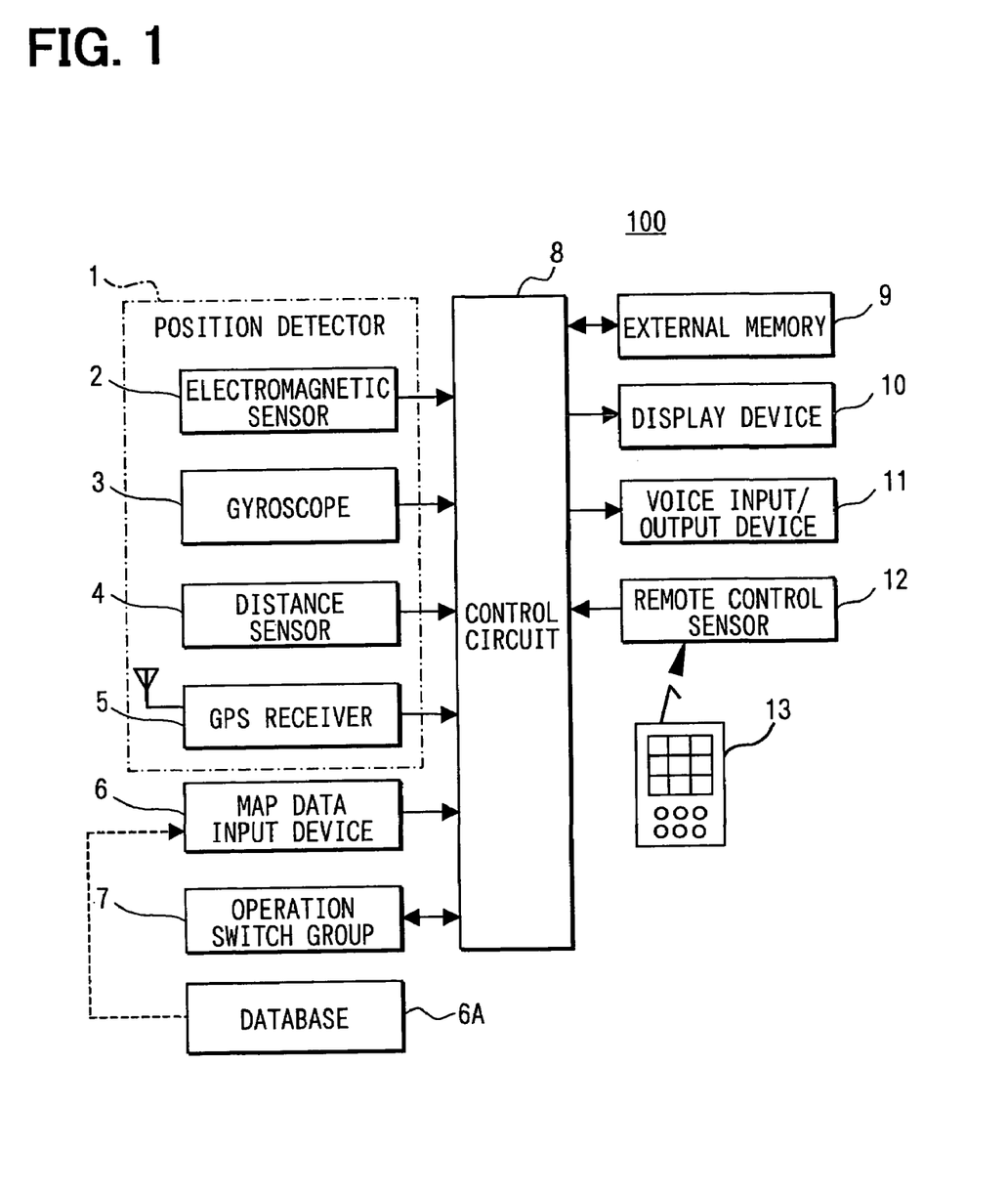
FIG. 1 is a block diagram showing a general configuration of a navigation device according to an embodiment of the present invention.

FIG. 1 is a block diagram showing a general configuration of the navigation device according to the embodiment. As shown in FIG. 1, a navigation device 100 comprises a position detector 1, a map data input device 6, an operation switch group 7, an external memory 9, a display device 10, a voice input/output device 11, a remote control sensor 12, and a control circuit 8 connected to these parts.

The control circuit 8 is configured as an ordinary computer. The control circuit 8 contains known components such as a CPU, ROM, RAM, I/O, and a bus line connecting these components. The ROM stores a program executed by the navigation device 100. The CPU and the like perform specified operations in accordance with the stored program.

The position detector 1 has known parts such as a geomagnetic sensor 2, a gyroscope 3, a distance sensor 4, and a GPS (Global Positioning System) receiver 5 to detect vehicle positions based on radio waves from satellites. These parts cause their own errors due to different characteristics and are therefore configured to be used by a plurality of sensors that complement each other. Depending on accuracies of the sensors, some of the above-mentioned parts may constitute the position detector 1. Further, it may be preferable to use, though not shown, a rotation sensor for the steering, a vehicle sensor of each rolling wheel, and the like.

The operation switch group 7 uses, for example, a touch switch integrated with the display device 10, a mechanical switch, and the like. The operation switch group 7 is used for various input operations such as scrolling a map displayed on a screen of the display device 10, entering text, selecting keys, and the like.

The external memory 9 uses a large-capacity readable and writable storage medium such as a memory card, HDD, and the like. The external memory 9 is used for obtaining image data and the like from the outside.

The display device 10 comprises a liquid crystal display, for example. The screen of the display device 10 can display a vehicle position mark and a map around the vehicle. The vehicle position mark corresponds to the vehicle's current position input from the position detector 1. The map is generated from a map database input from the map data input device 6.

The voice input/output device 11 comprises an input device and an output device (not shown). The input device recognizes the contents of user's narration and is used for various inputs to the navigation device 100. The output device comprises a speaker, an audio amplifier, and the like, and is used for voice guidance and the like.

The map data input device 6 is used for input of the map database and an information retrieval database 6A. Generally, these databases are stored in read-only storage media such as CD-ROM, DVD-ROM, and the like. The databases may be stored in writable storage media such as a memory card, a hard disk, and the like. The information retrieval database 6A will now be described.

The information retrieval database 6A according to the embodiment comprises an index data section and a detail data section. The index data section provides index data for a plurality of retrieval methods such as a name retrieval, a category retrieval, and a peripheral institution retrieval, for example. The name retrieval retrieves specific institutions by using institution names as retrieval keys. (Here, the institution is generally used to include a building, a company, a school, a shop, a restaurant, an office, a museum, a theater, an administrative office, or the like.) The category retrieval retrieves specific institutions by using institution categories as retrieval keys. The peripheral institution retrieval retrieves specific institutions by using positional information such as current positions as retrieval keys.

The index data stores only information needed for the retrieval methods. By contrast, the detail data section stores the other detailed information about institutions. Each index data stores an address for the detail data. The detail data can be referenced to from the index data. The index data also stores data for narrowing down many institutions, if any, matching a retrieval key.

The detail data section stores institution's detail data comprising the name, coordinates, positional address, telephone number, coordinate accuracy, and the like. The detail data is configured independently of the retrieval methods because it is referenced to from the index data using a unique retrieval method. The detail data section stores institution's detail data in the order of mesh numbers to be described. The mesh number will now be described.

Figure 2:
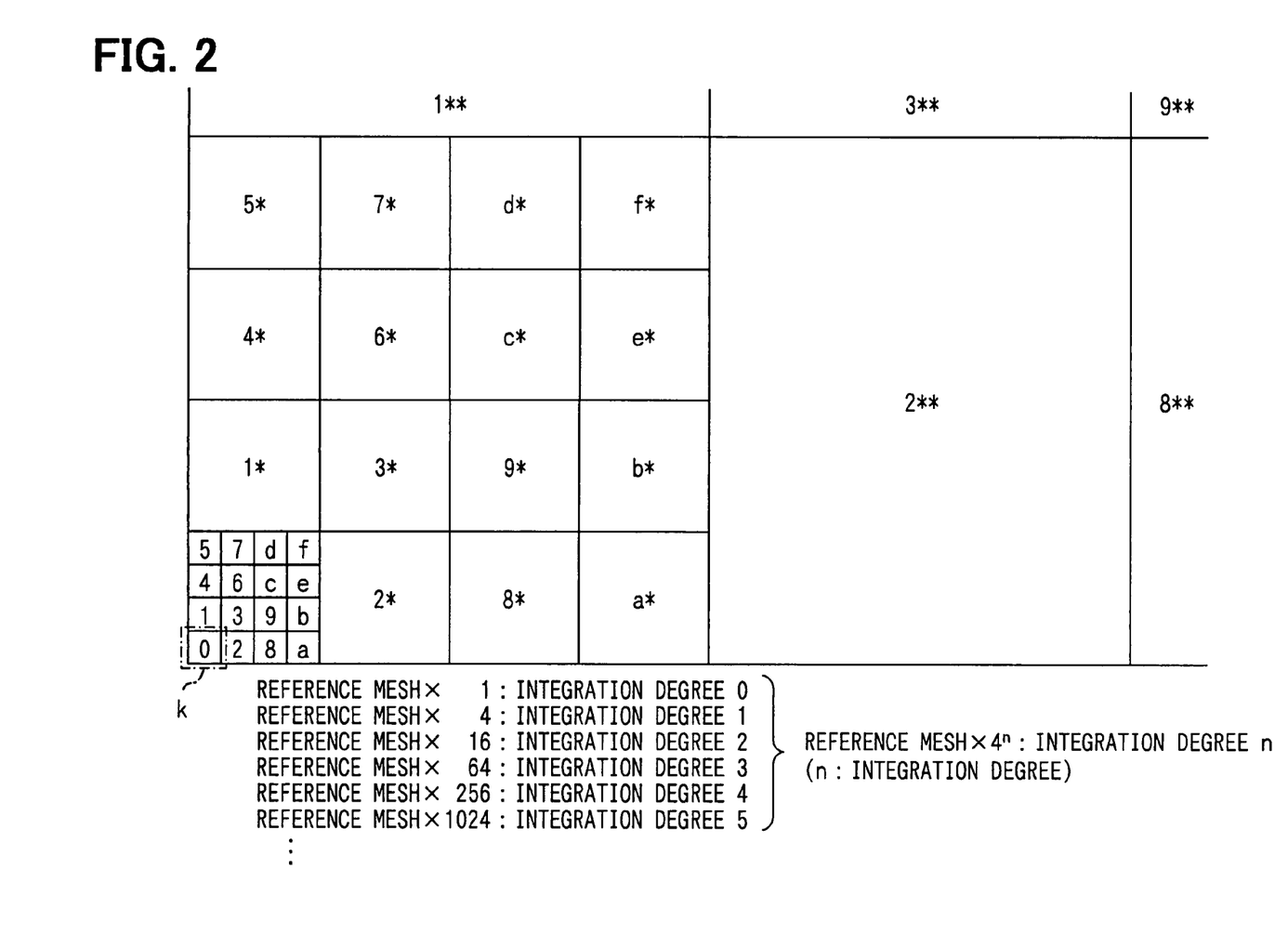
FIG. 2 schematically shows an example of dividing meshes, assigning mesh numbers, and integration degrees for meshes according to the embodiment.

According to the embodiment, for example, the retrieval range for an institution is divided into a parcel (hereafter referred to as a mesh) being one kilometer square as shown in FIG. 2. Mesh (k) is defined as a reference mesh comprising the minimum longitude (LOmin) and the minimum latitude (LAmin). Each mesh is numbered by moving in a shape of a letter N. The number assigned to each mesh corresponds to the mesh's integration degree.

As shown in FIG. 2, an area corresponding to one reference mesh (k) is defined to be a mesh of integration degree 0. Adjacent four meshes of integration degree 0 are sequentially numbered from 0 to 3 from the reference mesh (k) in the order of writing the letter N in one stroke. Further, adjacent meshes of integration degree 0 are sequentially numbered from 4 to f in the order of writing the letter N in one stroke by moving the starting point to the meshes (4, 8, c) of integration degree 0, as shown in FIG. 2. An area corresponding to the four meshes (0 to 3, 4 to 7, 8 to b, or c to f) of integration 0 is defined as a mesh of integration degree 1. Each of the meshes of integration degree 1 forms a size of two kilometers square.

Further, four meshes of integration degree 1 starting from the mesh of integration degree 1 (corresponding to the meshes of integration 0 (0 to 3)) in the order of writing the letter N in one stroke form a mesh of integration degree 2. The mesh of integration 2 includes 16 meshes (0 to f) of integration 0. The meshes of integration degree 2 are given a carry number (0*). The sign (*) denotes any hexadecimal numbers 0 to f. The meshes of integration degree 2 form a size of four kilometers square.

In this manner, the meshes of integration degree 2 comprise four meshes of integration degree 1. The meshes of integration degree 1 comprise four meshes of integration degree 0. These meshes are sequentially numbered 0 to f in hexadecimal.

Subsequently, four meshes of integration degree 2 form meshes of integration degree 3. These meshes are assigned mesh numbers 0* to 3* and form a size of 8 kilometers square. Four meshes of integration degree 3 form meshes of integration degree 4. These meshes are assigned mesh numbers 0* to f*. The meshes of integration degree 4 are given a carry number (0**). The meshes of integration degree 4 form a size of 16 kilometers square.

This process is repeated to provide meshes of integration degree 6 equivalent to 64 kilometers square, meshes of integration degree 8 equivalent to 256 kilometers square, and so on. The retrieval range is managed in an integrated manner.

In this manner, the institution's detail data is stored in the order of mesh numbers. Accordingly, the stored detail data are geographically adjacent to each other. The following describes a conventional name retrieval function in detail.

FIG. 3 shows an example of the conventional name retrieval function. For example, a user enters institution's name "AICHIKEN" (being Aichi Ken (prefecture)) to be retrieved. The name retrieval function retrieves institutions beginning with the entered name from index data for the name retrieval. A retrieval result in FIG. 3 shows matching data such as AICHIKENCHOU (Aichi prefectural office) and AICHIKENMINNOMORI (forest for Aichi prefectural residents).

As shown in FIG. 3, the matching index data contains an institution's name, an administrative JIS code assigned to each administrative district such as a prefecture (Ken), an area code assigned to each of city (Shi), ward, town, or village, a type code assigned to each institution type, an address of the institution's detail data, and the like. These pieces of data are needed for listing institution names and narrowing the institutions.

When the retrieval result shows many pieces of index data matching the entered name, for example, it is assumed to specify any area to retrieve institutions matching the specified area. The index data for name retrieval does not store coordinate information about institutions. Accordingly, the detail data needs to be accessed to extract institutions having the corresponding coordinates. As mentioned above, the detail data is configured independently of the retrieval methods because it is referenced to from the index data using a unique retrieval method. Consequently, the detail data section needs to be accessed to extract the corresponding data coordinates. However, too many accesses to the detail data disable an efficient access. As a result, an overall retrieval process consumes much time.

Another method may be assumed to store the coordinate information about institutions in the index data for name retrieval. The size of the index data itself increases. This also increases the number of acquisitions of the index data, thus degrading the performance.

The navigation device according to the embodiment uses meshes to define an area based on the extent of a user's living area. The institution's detail data is associated with all institutions in the meshes contained in the area. The navigation device obtains addresses of the institution's detail data from index data used for the peripheral institution retrieval or equivalent retrieval methods whose retrieval key includes positional information (position-related index data). The navigation device then extracts index data that corresponds to the obtained addresses and that is used for the name retrieval or equivalent retrieval methods whose retrieval key does not include positional information (position-unrelated index data). The navigation device then retrieves specific institutions from the extracted index data.

Figure 4:
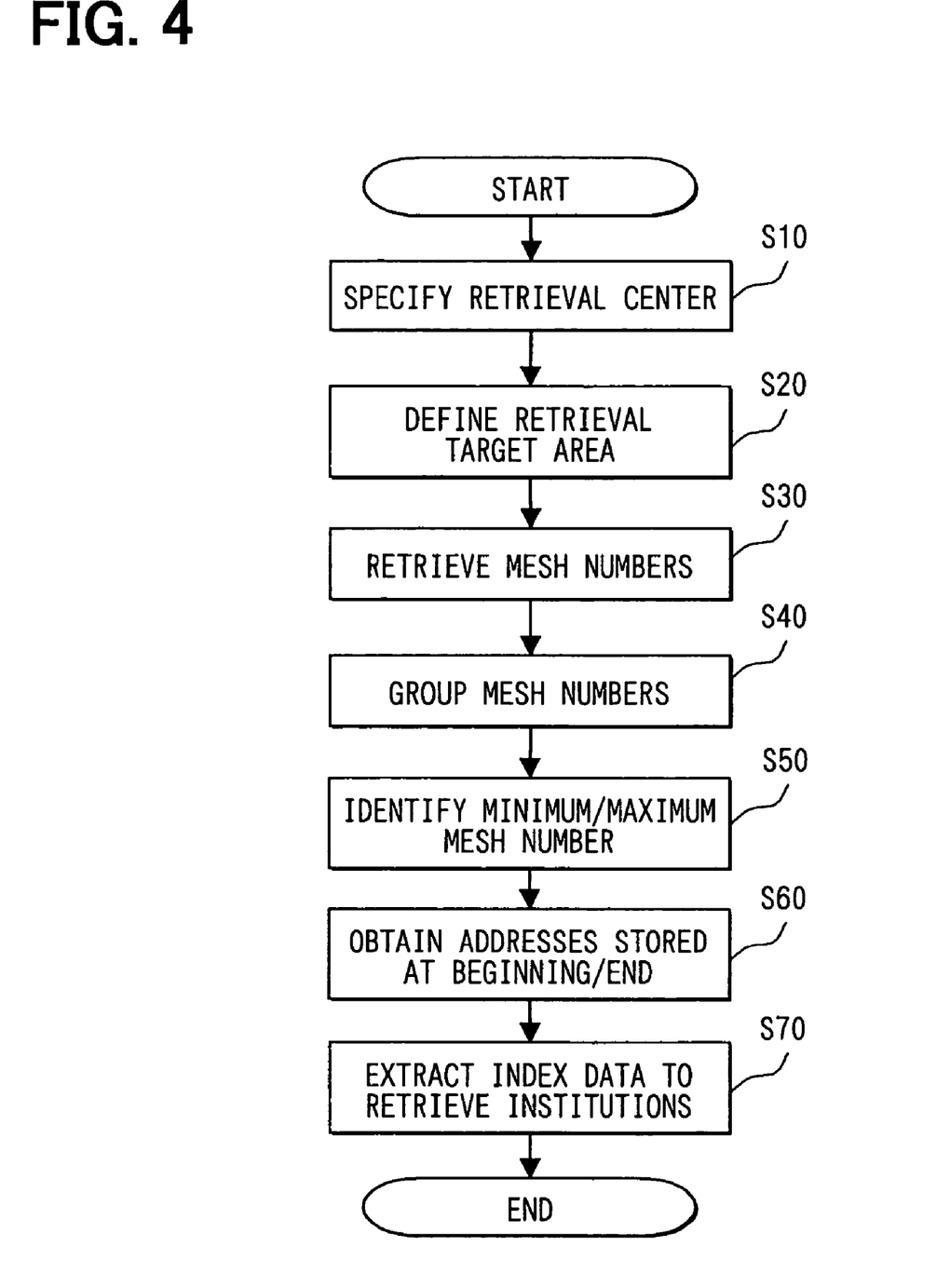
FIG. 4 is a flowchart showing an institution retrieval process according to the embodiment.
Figure 5:
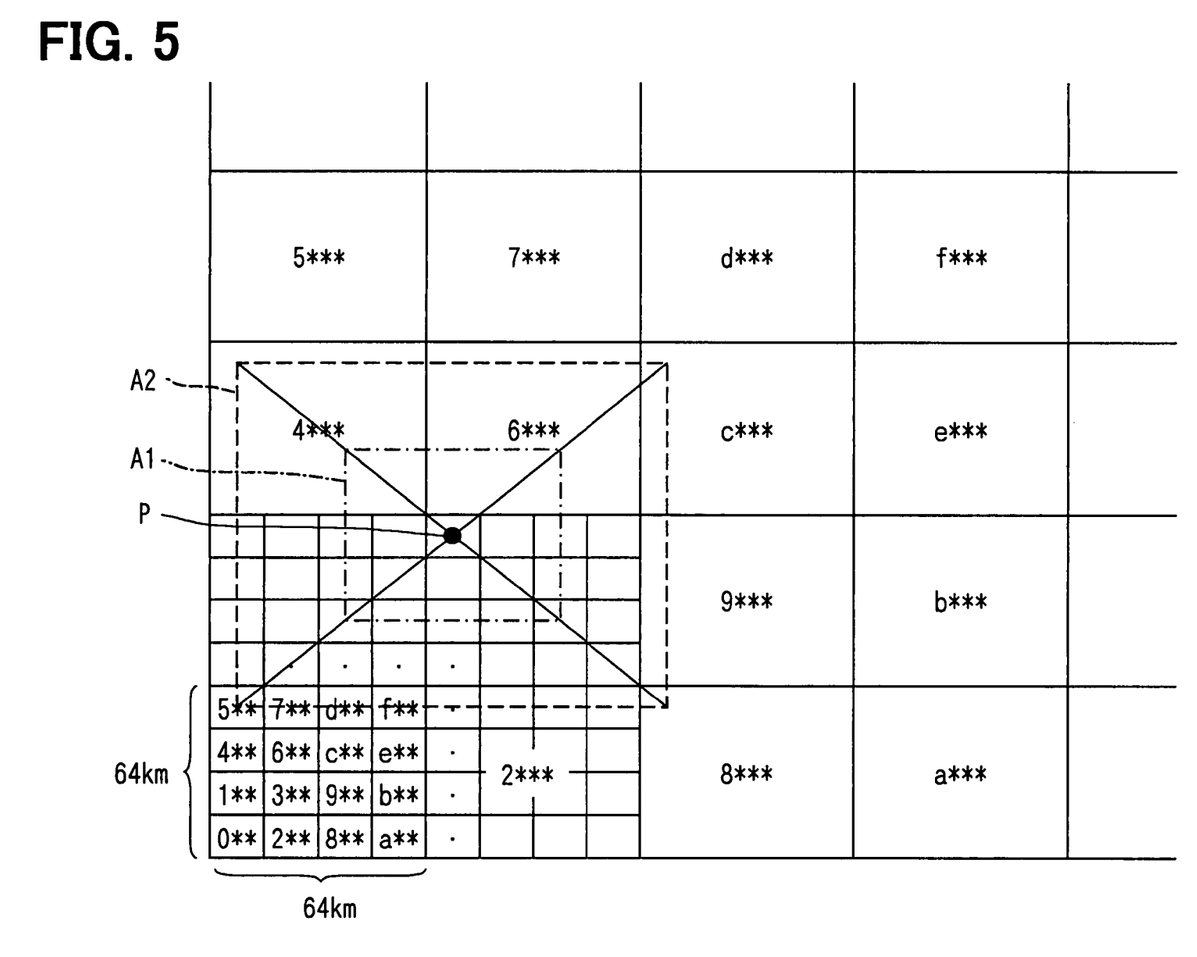
FIG. 5 schematically shows an example of setting areas according to the embodiment.
Figure 6:
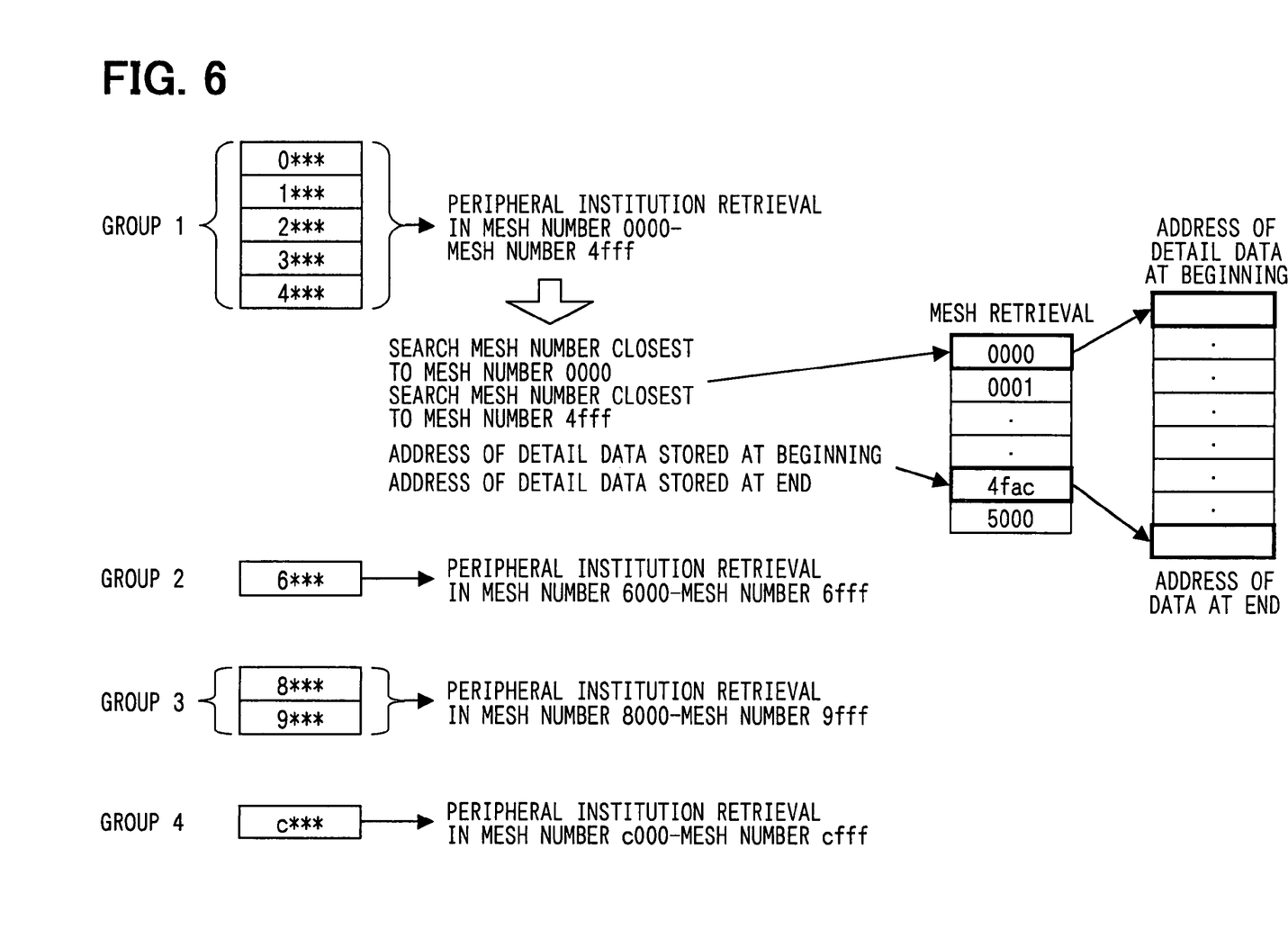
FIG. 6 schematically shows an example of obtaining detail data addresses according to the embodiment.

The following describes a process to retrieve specific institutions according to a characteristic portion of the embodiment with reference to FIGS. 4 to 6. FIG. 4 is a flowchart of the process. FIG. 5 is a schematic diagram showing an example of setting the area. FIG. 5 is a schematic diagram showing an example of obtaining addresses for the detail data.

At Step S10 in FIG. 4, the retrieval center is specified. For example, a map is displayed on the screen. A user specifies a point as the retrieval center on the map. The retrieval center can be specified as the user's home, current position, or any other points.

At Step S20, meshes are used to define an area around the center point specified at Step S10. For example, as shown in FIG. 5, the user specifies an area (A1) ensured for a first retrieval (hereafter referred to as an area A1) around the specified center point (P). The embodiment assumes the area A1 to be sized 64 kilometers square (equivalent to a mesh of integration degree 6).

Generally, it is possible to specify a user's living area in some degree. We can assume that the living area contains many institutions the user will retrieve using the navigation device 100. Accordingly, the area is defined based on a mesh of integration degree 6 equivalent to the extent of the user's living area.

As shown in FIG. 5, the area A1 overlaps a plurality of meshes of integration degree 6. In such case, the first retrieval target area is configured to comprise a mesh of integration degree 6 included in the area and a plurality of overlapped meshes of integration degree 6. In FIG. 5, the area A1 overlaps four meshes of integration degree 6 designated with mesh numbers 1*, 3*, 4*, and 6*. These four meshes of integration degree 6 are assumed to be the first retrieval target area. When the area A1 overlaps no mesh of integration degree 6, the area A1 is assumed to be the first retrieval target area.

Further, at Step S20, the user specifies an area (A2) ensured for a second retrieval (hereafter referred to as an area A2) around the specified center point (P). The embodiment assumes the area A2 to be sized 128 kilometers square (equivalent to a mesh of integration degree 7).

As shown in FIG. 5, the area A2 overlaps nine meshes of integration degree 6 designated with mesh numbers 0*, 1*, 2*, 3*, 4*, 6*, 8*, 9*, and c***. These nine meshes of integration degree 6 are assumed to be a second retrieval target area.

As mentioned above, the area A1 and the first retrieval target area including the area A1 are defined. The user can retrieve institutions in his or her living area by retrieving institutions in the meshes belonging to the first retrieval target area. When intended institutions cannot be retrieved from the first retrieval target area, the user can retrieve institutions from the second retrieval target area having a wider retrieval range.

At Step S30, the process retrieves mesh numbers in the first and second retrieval target areas defined at Step S20. For example, mesh numbers 0*, 1*, 2*, 3*, 4*, 6*, 8*, 9*, and c*** are retrieved from the second retrieval target area in FIG. 5.

At Step S40, the process sorts the mesh numbers retrieved at Step S30 in an ascending order to group the meshes having sequential mesh numbers. For example, the second retrieval target area in FIG. 5 comprises groups 1 to 4 as shown in FIG. 6. Group 1 comprises mesh numbers 0* through 4*. Group 2 comprises mesh number 6*. Group 3 comprises mesh numbers 8* and 9*. Group 4 comprises mesh number C*.

When meshes are provided with mesh numbers in the order of writing the letter N in one stroke according to the embodiment, the meshes belong to at least four groups and up to five groups.

At Step S50, the process identifies the minimum mesh number and the maximum mesh number for each group. At Step S60, the process obtains an address of the detail data stored at the beginning (or first) of the detail data section with respect to institutions in the mesh with the minimum mesh number. The process further obtains an address of the detail data stored at the end (last) of the detail data section with respect to institutions in the mesh with the maximum mesh number. These first and last addresses of the institution's detail data are obtained from index data used for the retrieval method whose retrieval key includes positional information such as a positional address, an area name, or a postal code.

At Step S70, the process extracts, from such index data as a name, a type of business, a category, and the like, index data corresponding to the first up to last addresses obtained as mentioned above. These index data are provided for the retrieval method whose retrieval key does not contain positional information. The process retrieves specific institutions from the extracted index data.

In this manner, the navigation device 100 according to the embodiment can retrieve specific institutions near the current position without access to the institution's detail data for referencing to coordinate data. As a result, it is possible to shorten the time spent for the retrieval process.

The following process is recommended before starting the process at Step S70. That is to say, the minimum and maximum latitudes and longitudes are found for the first and second retrieval target areas defined at Step S20. These latitudes and longitudes are associated with the first and last addresses of the detail data obtained from those areas and are registered as a backup area.

When the backup area contains an area to be retrieved next, specific institutions can be retrieved without retrieving mesh numbers. This method also eliminates the need to obtain addresses of the institution's detail data contained in the meshes. As a result, the retrieval time can be shortened greatly.

(Modification 1)

As explained in the embodiment of the present invention, for instance, index data corresponding to the first and broader second retrieval target areas are extracted, so that the retrieval time for retrieving an intended institution with respect to these target areas can be shortened. A modification 1 of the embodiment utilizes this feature of the invention.

When an entered institution name matches many candidate data as mentioned above, it is a general practice to narrow down the data using areas and the like. However, an intended institution may not be found after narrowing down the data by using areas.

Figure 7A:
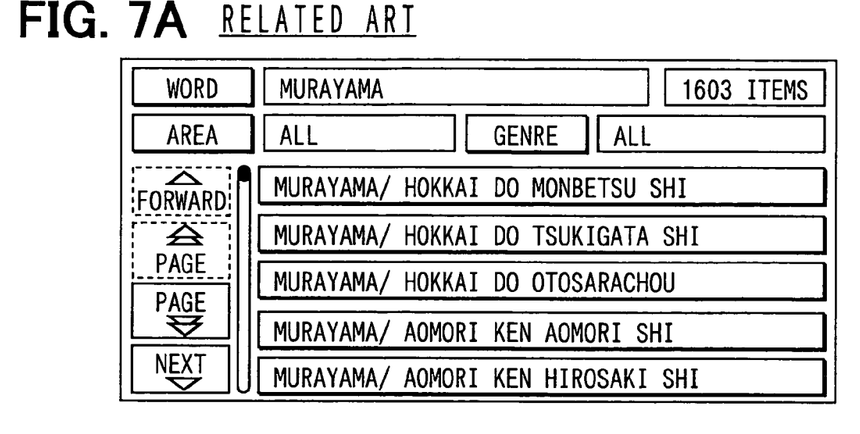
FIGS. 7A to 7C schematically show a problem of name retrieval of a related art.
Figure 7B:
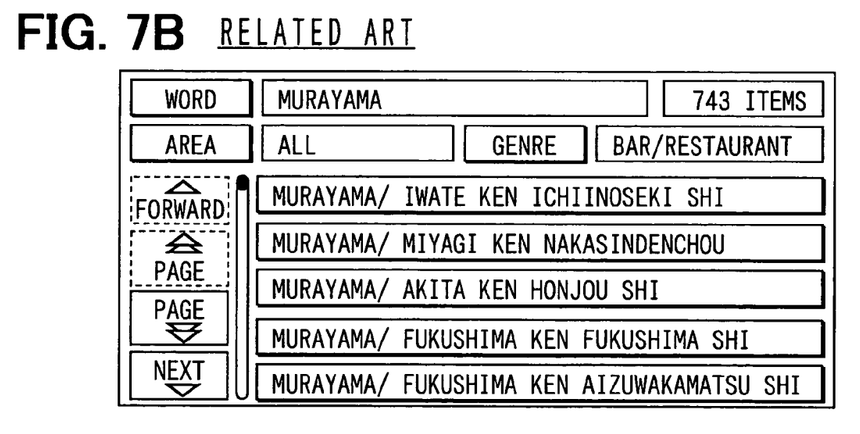
Figure 7C:
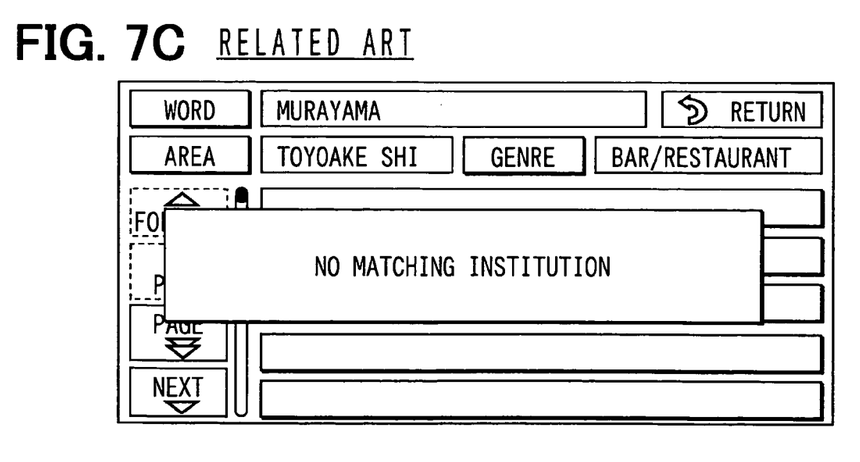

For example, it is considered to retrieve an institution named "Murayama Toyoake-ten" in Kariya Shi using a conventional name retrieval function. (Here, "Murayama" means a name of bar-restaurant, "Toyoake" means Toyoake City, "-ten" means a shop, and "Kariya Shi" means Kariya City.) When the user first enters "Murayama," 1603 institutions are retrieved as shown in FIG. 7A. When the user narrows down the result using the institution category "bar," the data are narrowed down to 743 as shown in FIG. 7B. When the user specifies the area "Toyoake Shi" to further narrow down the retrieved data, the resulting message displays "No matching institution" as shown in FIG. 7C.

This is because "Murayama Toyoake-ten" belongs to "Kariya Shi," not to "Toyoake Shi," and cannot be retrieved by limiting areas to "Toyoake Shi." When the intended institution cannot be retrieved by limiting areas to "Toyoake Shi," the modification applies the retrieval to "Near Toyoake Shi" by expanding areas to be retrieved. The following describes a process with the improved narrowing by areas with reference to a flowchart in FIG. 8.

Figure 8:
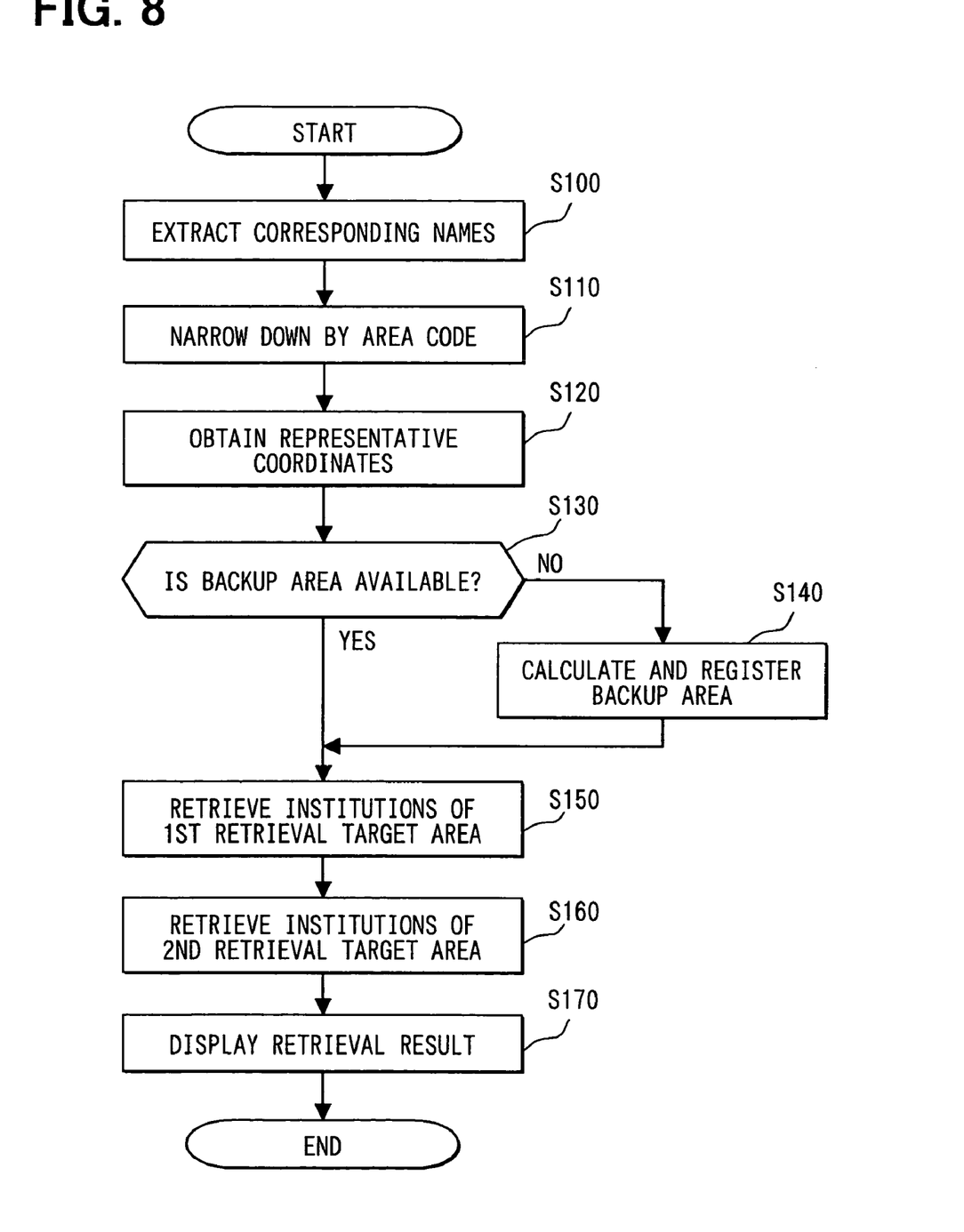
FIG. 8 is a flowchart showing a process with improved narrowing by areas according to modification 1 of the embodiment.

At Step S100 in FIG. 8, the process extracts institution names corresponding to a character string of the institution name entered by the user. A list of extracted institution names may be displayed on the screen. At Step S110, the process narrows down the institution names by an area code to limit the areas to be retrieved.

At Step S120, the process retrieves positional addresses corresponding to the area code to obtain representative coordinates in the area (e.g., coordinates of a government office). At Step S130, the process determines whether or not there is available a backup area including the areas limited at Step S110. When the result is affirmative, the process proceeds to Step S150. When the result is negative, the process proceeds to Step S140.

If there is no backup area including the associated areas, the process proceeds to Step S140 to calculate the first and second retrieval target areas around the coordinates obtained at Step S120 as the retrieval center. These areas are registered as a backup area.

At Step S150, the process retrieves institutions corresponding to the input institution name using the index data for institutions in the first retrieval target area. When a matching institution is retrieved, the list displays the institution name.

When no matching institutions are retrieved at Step S150, the process proceeds to Step S160. At Step S160, the process retrieves institutions corresponding to the input institution name using the index data for institutions in the second retrieval target area except the first retrieval target area. At Step S170, the retrieval result is displayed.

Figure 9:
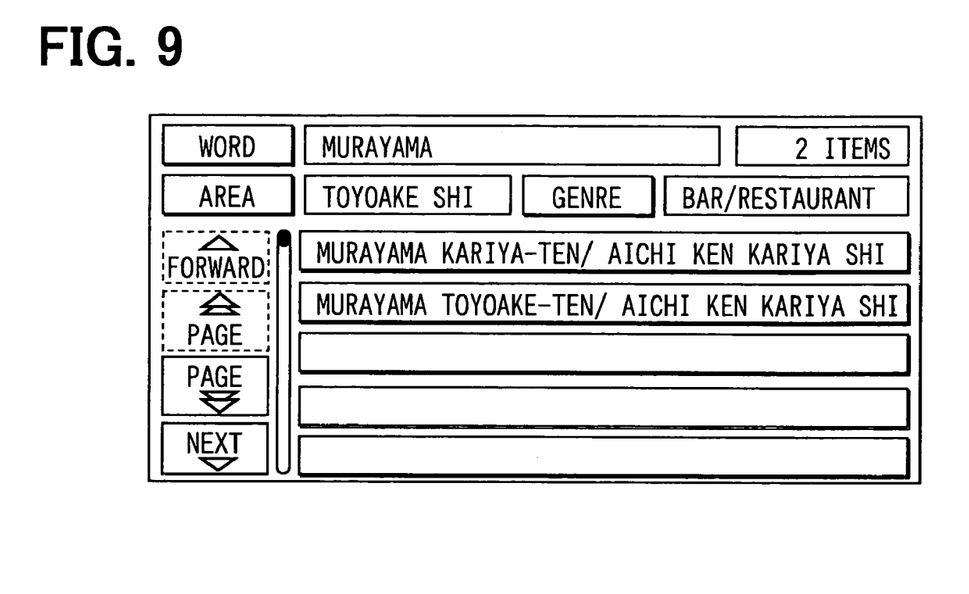
FIG. 9 schematically shows an example of displaying a retrieval result according to modification 1 of the embodiment.

If intended institutions cannot be retrieved by limiting areas, the institution retrieval can be performed by expanding the retrieval range to the neighborhood of the limited areas. When the institution such as "Murayama Toyoake-ten" belongs to "Kariya Shi," not to "Toyoake Shi," intended institutions can be retrieved. This is because the retrieval range includes "Kariya Shi" in the neighborhood of "Toyoake Shi" as shown in FIG. 9.

(Modification 2)

As explained in the embodiment, for instance, index data in the first and broader second retrieval target areas can be extracted. For instance, suppose that retrieved institution names are sorted in the order of distances from the retrieval center. In this case, sorting in the order of distances can be practically required for the institution names included only within the previously extracted index data. The following describes a list display process by sorting distances with reference to a flowchart in FIG. 10.

Figure 10:
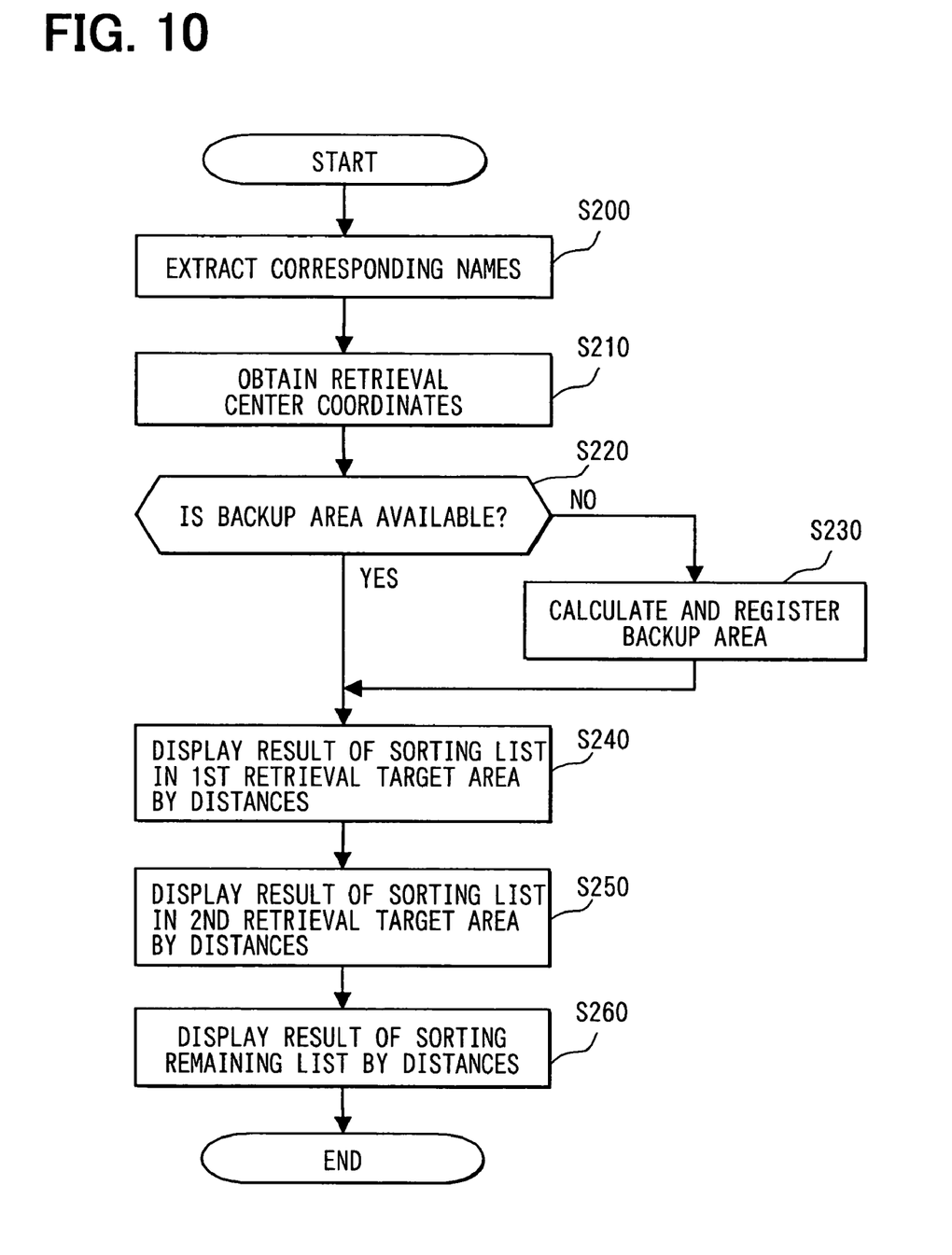
FIG. 10 is a flowchart showing a list display process to sort distances according to modification 2 of the embodiment.

At Step S200 in FIG. 10, the process extracts institution names corresponding to a character string of the institution name entered by the user. At Step S210, the user specifies the retrieval center. The process obtains coordinates for the specified retrieval center.

At Step S220, the process determines whether or not there is available a backup area including the coordinates obtained at Step S210. When the result is affirmative, the process proceeds to Step S240. When the result is negative, the process proceeds to Step S230.

At Step S230,. the process calculates and registers a backup area around the coordinates as the retrieval center obtained at Step S210. At Step S240, the process retrieves institutions in the first retrieval target area from the institutions corresponding to the input institution name. This process is performed by only using the index data corresponding to the first retrieval target area without calculating distances using coordinate data for institutions included in detail data. The process then sorts the retrieved institutions by distances from the retrieval center and displays the institutions in a list.

At Step S250, the process retrieves institutions in the second retrieval target area except the first retrieval target area from the institutions corresponding to the entered institution name. This process is performed by only using the index data corresponding to the second retrieval target area except the first retrieval target area without calculating distances using coordinate data for institutions included in detail data. The process then sorts the retrieved institutions by distances from the retrieval center and displays the institutions in a list. The list displays the institutions following the institution names retrieved from the first retrieval target area.

Figure 11:
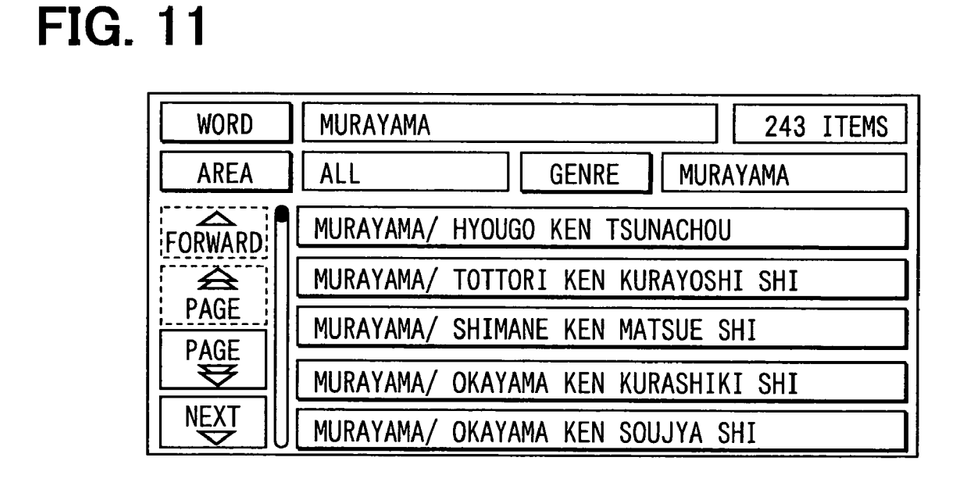
FIG. 11 schematically shows an example of displaying institution names sorted by distances from the retrieval center according to modification 2 of the embodiment.

Institutions corresponding to the entered institution name may be retrieved outside the first and second retrieval target areas. At Step S260, the process sorts such retrieved institutions by distances from the retrieval center and displays the institutions in a list. The list displays the institutions following the institution names retrieved from the second retrieval target area. In this manner, the institutions are displayed with their names sorted by distances from the retrieval center as shown in FIG. 11, for example. The user can easily find an intended institution name.

It will be obvious to those skilled in the art that various changes may be made in the above-described embodiments of the present invention. However, the scope of the present invention should be determined by the following claims.

What is claimed is:

1. A map information retrieving device comprising:
    a detail data storage unit for dividing an institution's retrieval range into a plurality of meshes, determining a given mesh as a reference mesh, sequentially providing numbers to four meshes in an order of the given mesh as a starting point, top, right, and top right of the given mesh so as to write a letter N in one stroke, moving the reference mesh to a certain mesh, repeating this process to provide the respective meshes with numbers, and sorting and storing institution's detail data in each of the meshes according to the provided numbers;
    an index data storage unit for storing index data which is used for institution retrieval and is provided for each of a plurality of retrieval methods;
    an area setup unit for setting an area containing a specified point as a reference on the retrieval range;
    a mesh number retrieval unit for retrieving a number of a mesh contained in the area;
    an address acquisition unit for acquiring
        an address of institution's detail data stored by the detail data storage unit at a beginning of a mesh with a minimum number retrieved by the mesh number retrieval unit and
        an address of institution's detail data stored by the detail data storage unit at an end of a mesh with a maximum number retrieved by the mesh number retrieval unit,
    from index data provided for a retrieval method whose retrieval key contains positional information;
    an index data acquisition unit for acquiring index data provided for a retrieval method whose retrieval key does not contain positional information;
    an extraction unit for extracting index data belonging to a range from the address of the institution's detail data stored at the beginning to the address of the institution's detail data stored at the end from the index data acquired by the index data acquisition unit; and
    a retrieval unit for retrieving a specific institution using the index data extracted by the extraction unit.

2. The map information retrieving device of claim 1 comprising:
    a group determination unit for determining a group of meshes assigned with sequential numbers retrieved by the mesh number retrieval unit,
    wherein the address acquisition unit acquires
        an address of institution's detail data stored by the detail data storage unit at a beginning of a minimum-numbered mesh constituting a group determined by the group determination unit and
        an address of institution's detail data stored by the detail data storage unit at an end of a maximum-numbered mesh constituting the group determined by the group determination unit,
    from index data provided for a retrieval method whose retrieval key contains positional information.

3. The map information retrieving device of claim 1, wherein the retrieval unit uses index data extracted by the extraction unit when a specific institution is retrieved according to at least any of an institution name, a type of business, and a category as a retrieval key.

4. The map information retrieving device of claim 1, wherein, when the four meshes have been numbered, the detail data storage unit collects the four meshes into a mesh of a first integration degree,
    wherein the detail data storage unit collects four meshes of the first integration degree into a mesh of a second integration degree by moving in an order of the mesh of the first integration degree as a starting point, top, right, and top right of the mesh of the first integration degree so as to write a letter N in one stroke,
    wherein the detail data storage unit collects four meshes of the second integration degree into a mesh of a third integration degree by moving in an order of the mesh of the second integration degree as a starting point, top, right, and top right of the mesh of the second integration degree so as to write a letter N in one stroke, wherein the detail data storage unit repeats this process to manage the institution's detail data using a plurality of integration degrees, and wherein the detail data storage unit provides each of the meshes with a number corresponding to the integration degree.

5. The map information retrieving device of claim 4, wherein the area setup unit sets an area based on a mesh of the integration degree.

6. The map information retrieving device of claim 5, wherein the area setup unit includes a change unit for changing an integration degree for an area to be set in accordance with a number of pieces of index data extracted by the extraction unit.

7. The map information retrieving device of claim 5, wherein, when a set area overlaps a plurality of meshes of an integration degree for the area, the area setup unit sets a new area including all of the overlapped meshes.

8. The map information retrieving device of claim 7, further comprising:

a storage unit for storing positional information of the new area in association with an address of institution's detail data stored at the beginning and an address of institution's detail data stored at the end, the addresses being acquired by the address acquisition unit with respect to the new area; and a determination unit for determining whether or not the new area stored by the storage unit includes the area set by the area setup unit based on meshes of the integration degree, wherein, when the determination unit determines that the new area includes the area, the extraction unit extracts index data corresponding to an address associated with the new area stored by the storage unit.

9. The map information retrieving device of claim 1, further comprising:

a point specification unit for specifying a point on the retrieval range, wherein the area setup unit sets an area with reference to the point specified by the point specification unit.

10. The map information retrieving device of claim 1, wherein the index data storage unit stores index data used for a retrieval method whose retrieval key includes at least any of a positional address, an area name, a postal code, a sightseeing spot name, coordinates, and a mesh calculated from coordinates, the index data being provided for a retrieval method whose retrieval key includes the positional information, and wherein the index data storage unit stores index data used for a retrieval method whose retrieval key includes at least any of a name, a category, and an object, the index data being provided for a retrieval method whose retrieval key does not include the positional information.

11. A map information retrieving method, comprising steps of:

dividing an institution's retrieval range into a plurality of meshes, determining a given mesh as a reference mesh, sequentially providing numbers to four meshes in an order of the given mesh as a starting point, top, right, and top right of the given mesh so as to write a letter N in one stroke, moving the reference mesh to a certain mesh, repeating this process to provide the respective meshes with numbers, and sorting institution's detail data in each of the meshes according to the provided numbers;

setting an area containing a specified point as a reference on the retrieval range;

retrieving a number of a mesh contained in the area;

acquiring an address of institution's detail data stored at a beginning of the retrieved mesh with a minimum number and an address of institution's detail data stored at an end of the retrieved mesh with a maximum number, the addresses being acquired from index data provided for a retrieval method whose retrieval key contains positional information;

acquiring index data provided for a retrieval method whose retrieval key does not contain positional information;

extracting index data belonging to a range from the address of the institution's detail data stored at the beginning to the address of the institution's detail data stored at the end from the acquired index data; and retrieving a specific institution using the extracted index data.

12. The map information retrieving method of claim 11, further comprising a step of:

determining a group of meshes assigned with sequential mesh numbers of the retrieved mesh numbers, wherein the address of the institution's detail data stored at the beginning and the address of the institution's detail data stored at the end are acquired by acquiring an address of institution's detail data stored at a beginning of a minimum-numbered mesh constituting the determined group and an address of institution's detail data stored at an end of a maximum-numbered mesh constituting the group.

13. The map information retrieving method of claim 11, wherein the extracted index data is used when a specific institution is retrieved according to at least any of an institution name, a type of business, and a category as a retrieval key.

14. The map information retrieving method of claim 11, further comprising steps of:

collecting the four meshes into a mesh of a first integration degree when the four meshes have been numbered;

collecting four meshes of the first integration degree into a mesh of a second integration degree by moving in an order of the mesh of the first integration degree as a starting point, top, right, and top right of the mesh of the first integration degree so as to write a letter N in one stroke;

collecting four meshes of the second integration degree into a mesh of a third integration degree by moving in an order of the mesh of the second integration degree as a starting point, top, right, and top right of the mesh of the second integration degree so as to write a letter N in one stroke;

repeating this process to manage the institution's detail data using a plurality of integration degrees; and providing each of the meshes with a number corresponding to the integration degree.

15. The map information retrieving method of claim 14, wherein the specified area is set in the retrieval range based on a mesh of the integration degree.

16. The map information retrieving method of claim 15, further comprising a step of:

changing an integration degree for an area to be set in accordance with a number of pieces of the index data to be extracted.

17. The map information retrieving method of claim 15, wherein, when the set area overlaps a plurality of meshes of an integration degree for the area, a new area is set to include all of the overlapped meshes.

18. The map information retrieving method of claim 17, further comprising steps of:
storing positional information of the new area in association with an address of institution's detail data stored at the beginning and an address of institution's detail data stored at the end, the addresses being acquired with respect to the new area; and
determining whether or not the new area to be stored includes the area based on meshes of the integration degree,
wherein, when it is determined that the new area includes the area, index data corresponding to an address associated with the stored new area is extracted.

19. The map information retrieving method of claim 11, further comprising a step of:
specifying a point on the retrieval range,
wherein the area is set with reference to the specified point.

20. The map information retrieving method of claim 11, wherein index data provided for a retrieval method whose retrieval key includes the positional information is used for a retrieval method whose retrieval key includes at least any of a positional address, an area name, a postal code, a sightseeing spot name, coordinates, and a mesh calculated from coordinates, and
wherein the index data provided for a retrieval method whose retrieval key does not include the positional information is used for a retrieval method whose retrieval key includes at least any of a name, a category, and an object.

21. A computer program product of map information retrieving, the product including a computer readable medium and a set of instructions comprising of steps:
dividing an institution's retrieval range into a plurality of meshes, determining a given mesh as a reference mesh, sequentially providing numbers to four meshes in an order of the given mesh as a starting point, top, right, and top right of the given mesh so as to write a letter N in one stroke, moving the reference mesh to a certain mesh, repeating this process to provide the respective meshes with numbers, and sorting institution's detail data in each of the meshes according to the provided numbers;
setting an area containing a specified point as a reference on the retrieval range;
retrieving a number of a mesh contained in the area;
acquiring an address of institution's detail data stored at a beginning of the retrieved mesh with a minimum number and an address of institution's detail data stored at an end of the retrieved mesh with a maximum number, from index data provided for a retrieval method whose retrieval key contains positional information;
acquiring index data provided for a retrieval method whose retrieval key does not contain positional information;
extracting index data belonging to a range from the address of the institution's detail data stored at the beginning to the address of the institution's detail data stored at the end from the acquired index data; and
retrieving a specific institution by using the extracted index data.

22. The computer program product of map information retrieving of claim 21,
wherein the set of instructions further comprises a step of:
determining a group of meshes assigned with the retrieved sequential mesh numbers,
wherein the step of acquiring an address of institution's detail data stored at a beginning and an address of institution's detail data stored at an end acquires an address of institution's detail data stored at a beginning of a minimum-numbered mesh constituting the determined group and an address of institution's detail data stored at an end of a maximum-numbered mesh constituting the group.

23. The computer program product of map information retrieving of claim 21,
wherein the step of retrieving a specific institution uses the extracted index data when a specific institution is retrieved according to at least any of an institution name, a type of business, and a category as a retrieval key.

24. The computer program product of map information retrieving of claim 21,
wherein the set of instructions further comprises steps of:
collecting the four meshes into a mesh of a first integration degree when the four meshes have been numbered;
collecting four meshes of the first integration degree into a mesh of a second integration degree by moving in an order of the mesh of the first integration degree as a starting point, top, right, and top right of the mesh of the first integration degree so as to write a letter N in one stroke;
collecting four meshes of the second integration degree into a mesh of a third integration degree by moving in an order of the mesh of the second integration degree as a starting point, top, right, and top right of the mesh of the second integration degree so as to write a letter N in one stroke;
repeating this process to manage the institution's detail data using a plurality of integration degrees; and
providing each of the meshes with a number corresponding to the integration degree.

25. The computer program product of map information retrieving of claim 24,
wherein the step of setting an area sets an area based on a mesh of the integration degree.

26. The computer program product of map information retrieving of claim 25,
wherein the set of instructions further comprises a step of:
changing an integration degree for an area to be set in accordance with a number of pieces of the index data to be extracted.

27. The computer program product of map information retrieving of claim 25,
wherein, when the set area overlaps a plurality of meshes of an integration degree for the area, a new area is set to include all of the overlapped meshes.

28. The computer program product of map information retrieving of claim 27,
wherein the set of instructions further comprises steps of:
storing positional information of the new area in association with an address of institution's detail data stored at the beginning and an address of institution's detail data stored at the end, the addresses being acquired with respect to the new area; and
determining whether or not the new area to be stored includes the area based on meshes of the integration degree, wherein, when it is determined that the new area includes the area, the step of extracting index data extracts index data corresponding to an address associated with the stored new area.

29. The computer program product of map information retrieving of claim 21,
wherein the step of setting an area sets an area with reference to a point specified on the retrieval range.

30. The computer program product of map information retrieving of claim 21,
wherein index data provided for a retrieval method whose retrieval key includes the positional information is used for a retrieval method whose retrieval key includes at least any of a positional address, an area name, a postal code, a sightseeing spot name, coordinates, and a mesh calculated from coordinates, and
wherein the index data provided for a retrieval method whose retrieval key does not include the positional information is used for a retrieval method whose retrieval key includes at least any of a name, a category, and an object.

31. A map information retrieving device comprising:
a first data storage for storing detail data for specifying institutions in each of meshes, to which each of institutions corresponds, in an order of mesh numbers, wherein the mesh numbers are sequentially provided to the meshes into which an institution's retrieval range is divided,
a second data storage for storing index data correlated with the detail data by including an address of the detail data in the first data storage, wherein the index data is used for institution retrieval and is provided for each of a plurality of retrieval methods, wherein the index data includes position-related index data provided for a retrieval method whose retrieval key contains positional information and position-unrelated index data provided for a retrieval method whose retrieval key contains no positional information; and
a controller,
wherein the controller includes:
an area setup unit for setting an area containing a specified point as a reference on the retrieval range;
a mesh number retrieval unit for retrieving a mesh number of a mesh contained in the area;
an address acquisition unit for acquiring, from the position-related index data in the second data storage,
a first address of detail data stored in the first storage at a beginning of a mesh with a minimum number retrieved by the mesh number retrieval unit and
a last address of detail data stored in the first storage at an end of a mesh with a maximum number retrieved by the mesh number retrieval unit;
an extraction unit for extracting, from the position-unrelated index data in the second data storage, index data belonging to a range from the first address to the last address of the detail data; and
a retrieval unit for retrieving a specific institution using the index data extracted by the extraction unit.

32. A map information retrieving device of claim 31,
wherein the mesh numbers are provided by dividing the institution's retrieval range into the meshes, determining a given mesh as a reference mesh, sequentially providing mesh numbers to four meshes in an order of the given mesh as a starting point, top, right, and top right of the given mesh so as to write a letter N in one stroke, moving the reference mesh to a certain mesh, repeating this process to provide the respective meshes with mesh numbers.

* * * * *